United States Patent [19]
Keith, Jr.

[11] 4,131,403
[45] Dec. 26, 1978

[54] MOUNTING PRESS

[75] Inventor: Marvin W. Keith, Jr., Evanston, Ill.

[73] Assignee: Buehler Ltd., Evanston, Ill.

[21] Appl. No.: 831,892

[22] Filed: Sep. 9, 1977

Related U.S. Application Data

[63] Continuation of Ser. No. 603,102, Aug. 8, 1975, abandoned.

[51] Int. Cl.² ............................................. B29C 3/00
[52] U.S. Cl. ................................. 425/127; 425/128; 100/269 R
[58] Field of Search ............... 425/127, 128, 412, 413, 425/416, 419; 100/269 R; 254/93 H

[56] References Cited
U.S. PATENT DOCUMENTS

| | | | |
|---|---|---|---|
| 584,693 | 6/1897 | Marshall | 425/416 |
| 2,283,593 | 5/1942 | Akins | 254/93 H |
| 3,844,534 | 10/1974 | Sessody | 254/93 H |
| 3,999,916 | 12/1976 | Hable et al. | 425/352 |

*Primary Examiner*—Richard B. Lazarus
*Attorney, Agent, or Firm*—Charles F. Pigott, Jr.

[57] ABSTRACT

A portable hydraulic press for use in preparing metallurgical specimens, is disclosed herein, which requires relatively little force to operate and eliminates repumping during specimen preparation. The press includes a linkage assembly which connects an operating handle to a hydraulic jack in a manner such that both the mechanical advantage of the operating handle and ease of operation of the press is increased. In the embodiment shown, the press is constructed and arranged to provide ease of removal of the hydraulic jack without disassembling the entire press and includes a frame which stores energy.

7 Claims, 7 Drawing Figures

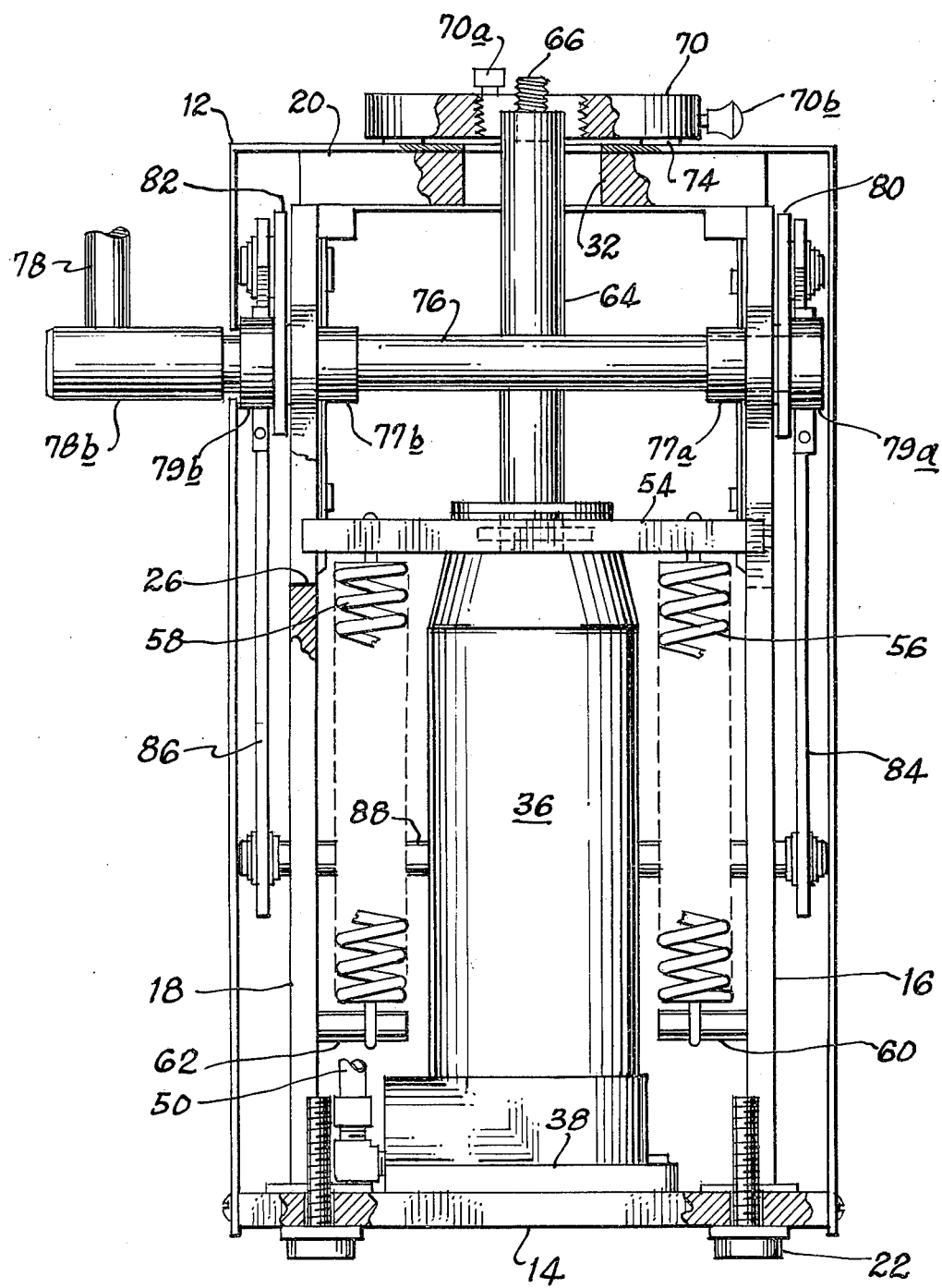

MOUNTING PRESS

This is a continuation of application Ser. No. 603,102 filed Aug. 8, 1975 and now abandoned.

BACKGROUND OF THE INVENTION

This invention relates to a compression molding equipment, and more particularly, to a portable manually-operated hydraulic press used for mounting metallurgical specimens in a plastic mount.

Metal specimens which are to be examined metallographically are mounted in a plastic sample or mount wherein the specimen is embedded in the plastic with one side exposed for examination. The sample is prepared by placing the specimen in a molding press, adding the plastic mounting material and curing the plastic under pressure with heat.

The prior art molding presses include a hydraulic jack which provides the pressure for the molding. However, in order to provide the necessary pressure, these presses have had long jack operating handles, positioned at the bottom of the press, in order to achieve the necessary mechanical advantage to operate the jack. These long handles have caused stability problems in that under some conditions the operator could pull on the handle and cause the entire press to tip forwardly toward the operator. Furthermore, more women have become metallurgical technicians and have found these prior art presses difficult to use.

It is therefore an object of this invention to provide a press having a force application system which avoids the stability problems of the prior art presses and which is easier to use.

The prior art presses also require constant attention and repetitive pumping of the jack during the molten stage when the thermoplastic or thermosetting resin is changing from a powder to a viscous liquid in order to maintain the molding pressure.

It is therefore another object of this invention to provide an inexpensive, compact laboratory press of relatively simple design and construction that eliminates repumping of the press during the molten stage of the resin and requires a minimum of operator attention.

The foregoing and other objects and advantages will be apparent from the following description and appended claims taken in conjunction with the drawings.

SUMMARY OF THE INVENTION

There is provided by virtue of this invention a portable manually-operated hydraulic press of relatively simple design and construction for use in compression molding. The press is particularly useful for mounting metallurgical specimens and needs only minimum operator attention.

The press includes a linkage assembly operatively associated with the operator handle for multiplying the manual actuating force and transmitting the force to the hydraulic jack which produces the compression force to be applied to the mounting material. The linkage assembly: (1) provides a press which requires less operator force than was required by the prior art; (2) results in a more stable press; and (3) is constructed to apply more force at the end of the stroke of the operator handle than at the beginning thereof.

The press also includes a frame assembly which stores energy during the pumping cycle for use during the molding cycle. It has been found that this arrangement avoids repetitive pumping and constant operator attention during molding.

A more detailed explanation of the invention is provided in the following description and appended claims taken in conjunction with the drawings.

BRIEF DESCRIPTION OF THE DRAWINGS

FIG. 5 is an enlarged fragmentary rear view of the mounting press partially in cross-section with the housing rear walls and other parts removed;

DESCRIPTION OF THE ILLUSTRATIVE EMBODIMENT

Figure 1:
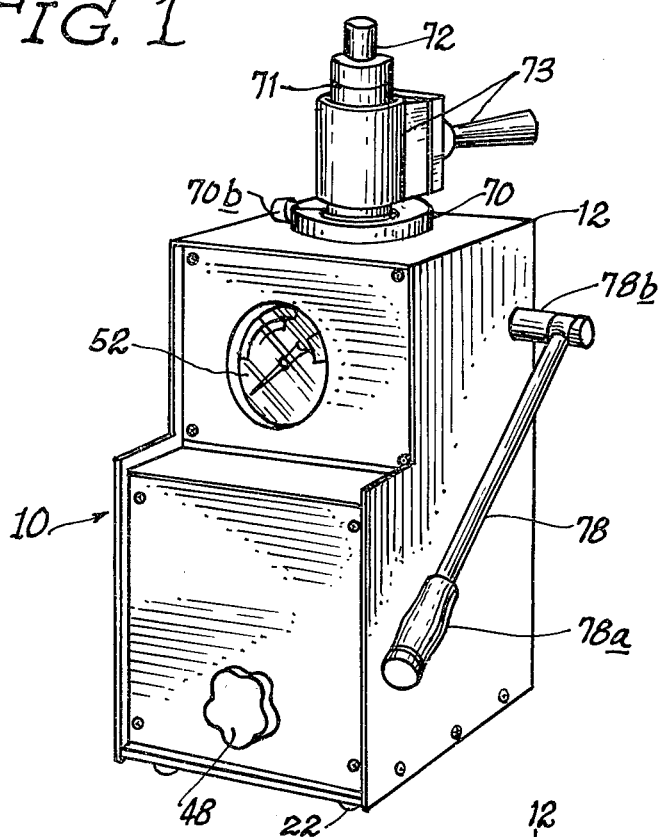
FIG. 1 is a perspective view of a mounting press in accordance with principles of the present invention.
Figure 7:
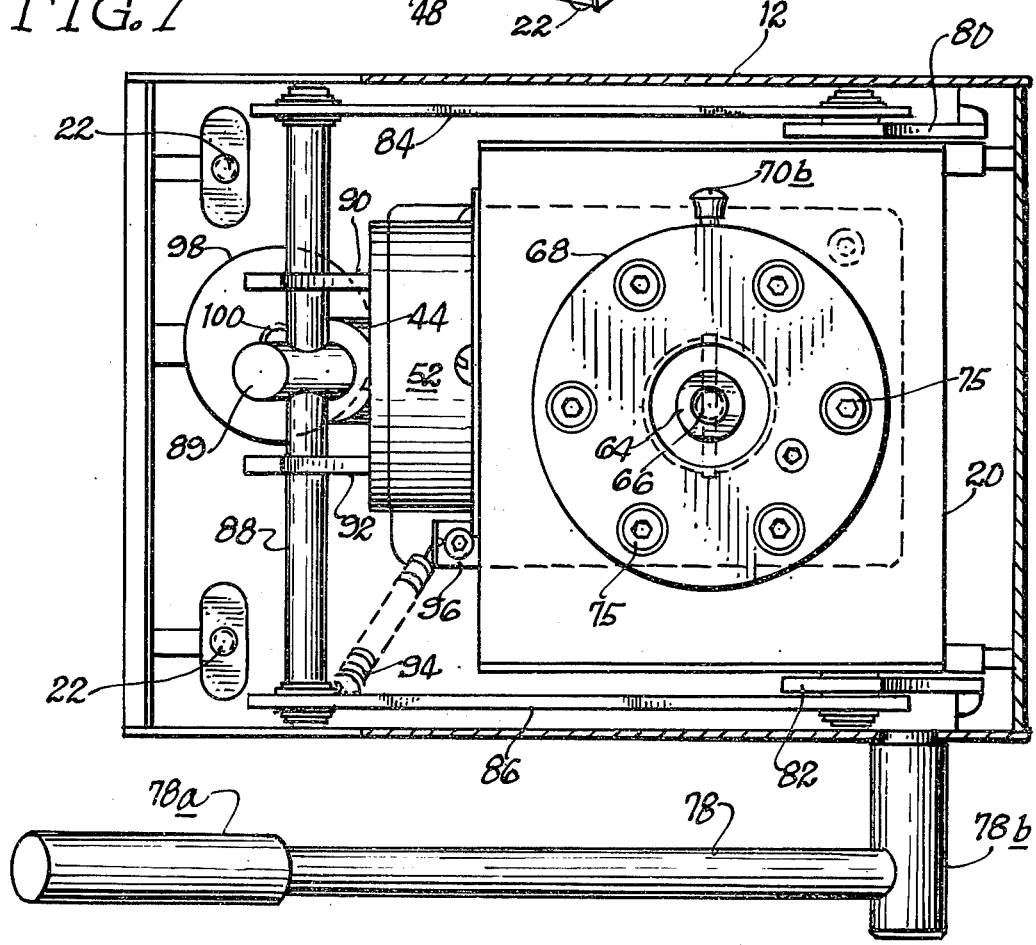
FIG. 7 is an enlarged top view of the press partially in cross-section with the housing top wall and other parts removed for ease of illustration.
Figure 6:
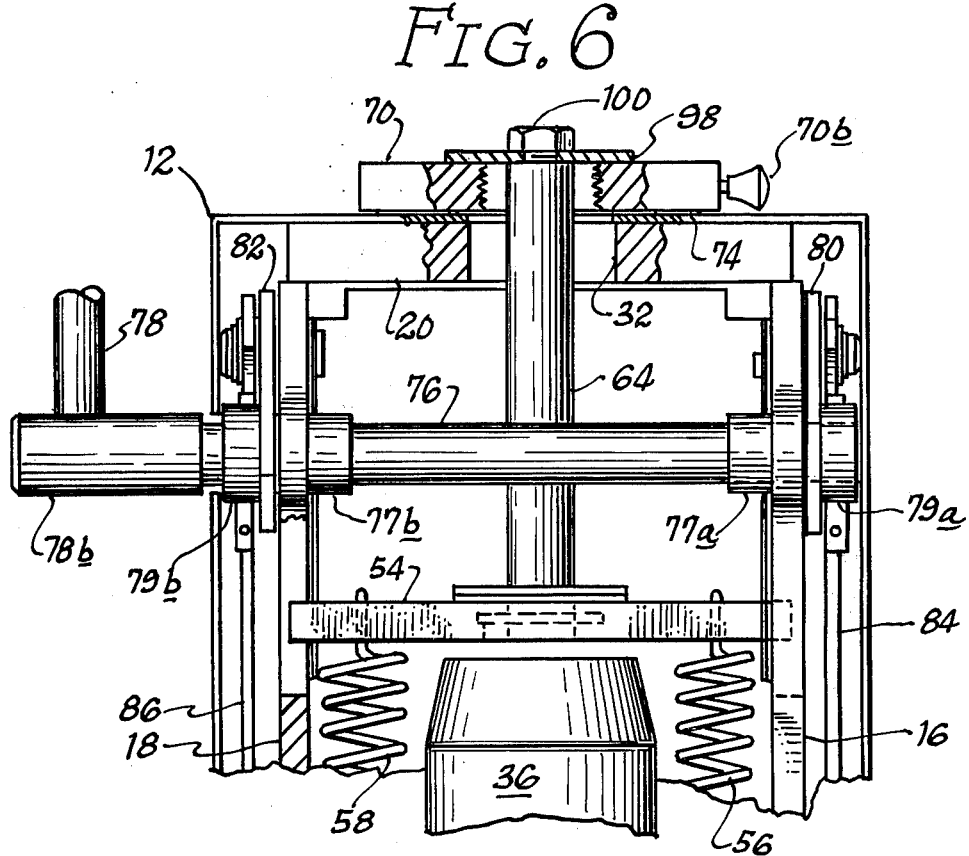
FIG. 6 is an enlarged fragmentary rear view of the mounting press similar to FIG. 5 showing the press in position to permit removal of the hydraulic jack.

Referring now to the drawings, there is shown a portable hydraulic mounting press 10 for use in compression molding. The press is particularly useful for mounting metallurgical specimens but may also be used for petrography.

The press includes five major assemblies which are: (1) a box-like frame assembly; (2) a hydraulic jack assembly; (3) a ram assembly positioned upon the jack assembly; (4) a mold assembly positioned above the ram assembly; and (5) a linkage assembly carried on the frame and connected to the jack for raising the ram assembly into the mold assembly. The frame assembly, jack assembly, ram assembly and substantially all of the linkage assembly are enclosed within a sheet metal housing 12.

THE FRAME ASSEMBLY

The frame assembly is a box-like structure which includes: a base plate 14; a pair of spaced parallel side walls 16 and 18 welded to the base plate and extending upwardly therefrom; and a top plate 20 which is welded to the top edge of each of the side plates 16 and 18.

The base plate is larger than the top plate and has a rubber-tipped screw-type leveler, such as 22, positioned at each corner thereof. The arrangement of the frame assembly effects a very stable press which need not be bolted to a table or work bench. The back edge of each of the side plates is positioned adjacent the back edge of the base plate and each side plate includes an elongated guide slot such as 24 or 26 in an upper position thereof. A pair of channel shaped Teflon guides, such as 28 and 30, are positioned against the facing edges of each slot.

The top plate includes a central ram receiving aperture 32 and six internally threaded apertures, such as 34.

THE HYDRAULIC JACK ASSEMBLY

The hydraulic jack assembly inclues a five-ton hydraulic jack 36, which is carried by a support plate 38 and bolted to the base plate between the two side plates. The support plate includes a pair of forwardly positioned upstanding ears 40 and 42, which pivotally support one end of a pivotable socket connector 44 for actuating the jack. Operation of the connector causes the jack piston (not shown) to move vertically upward. The top end of the jack is positioned slightly above the bottom edges of the slide plate guide slots 24 and 26.

A rotatable pressure control arm 46 extends forwardly from the jack, terminates at its forward end in a control knob 48, and is connected to the jack at its rearward end to control the hydraulic pressure therein. A hydraulic line 50 connects the jack assembly to a pressure gauge 52.

THE RAM ASSEMBLY

The ram assembly is positioned within the frame assembly and is biased against and raised by the jack assembly. The ram assembly includes a horizontally oriented transverse abutment plate 54, which has outer edges that slidably cooperate with the side plate guide slots 24 and 26. The abutment plate also includes a pair of spring-receiving openings and a pair of diametrically opposed spring-engaging fingers, such as 55, which extend into said openings. A pair of tension springs 56 and 58 are provided for biasing the abutment plate and the ram assembly in the downward direction against the jack. One member of the pair of springs is positioned on either side of the jack, between the jack and the respective side plates. Each spring is connected at one end to one of the spring-engaging fingers 55 and at the other end to one of the spring-retaining studs 60 and 62, which extend inwardly from the side plate adjacent the base plate.

An elongated cylindrical ram 64 is centrally positioned on the abutment plate and secured thereto in general vertical alignment with the jack axis. The ram extends upwardly through the ram-receiving aperture and is internally threaded at its upper end to receive a reduced diameter externally-threaded ram stud or plunger 66. A cylindrical mold base or platten 67 constructed and arranged to matingly fit upon the stud, is normally mounted to the stud.

THE MOLD ASSEMBLY

A mold assembly is removably mounted on the top plate and includes an annular internally-threaded mold collar or adapter 70, a removable hollow mold cylinder 71 capped by a removable lid or mold closure 72. The mold cylinder is surrounded with a removable thermostatically-controlled heater sleeve assembly 73. The collar is spaced from the top plate by a spacer 74 and fixedly positioned to the top plate by six hexagonal shoulder screws 75 which threadedly engage the internally threaded apertures 34 of the top plate. The collar includes an upwardly extending socket head screw 70a and a locking knob 70b which cooperate to align and removably secure the mold cylinder which is recessed to matingly receive the socket head screw 70a. The heater sleeve assembly 73 may be removed for faster cooling and replaced by a solid-chill cooler block or water cooler (not shown).

The ram is adapted to cooperate with the mold assembly by moving the mold base 67 into the mold assembly so as to define an enclosed molding cavity therein. The upward movement of the ram assembly toward the mold closure applies the molding pressure. It should be noted that the distance between the top of the mold collar and top of the jack is greater than the length of the ram.

THE LINKAGE ASSEMBLY

Figure 2:
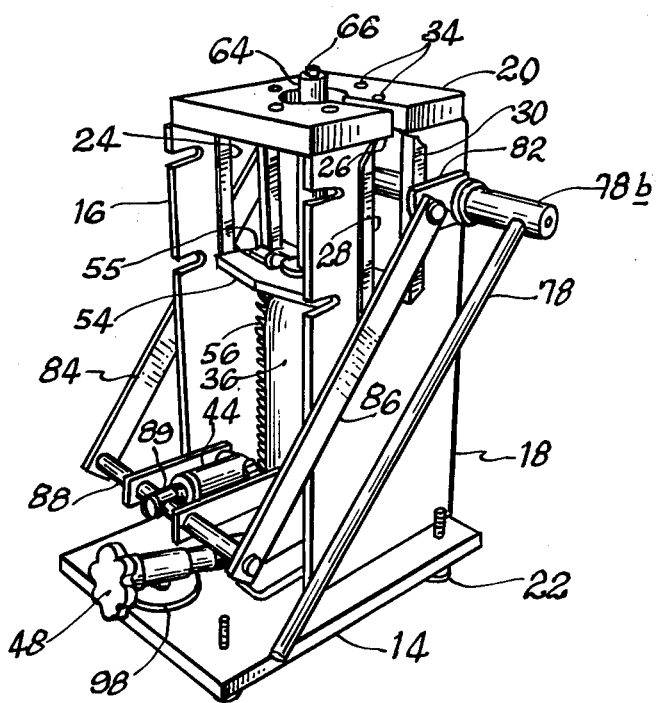
FIG. 2 is a perspective view of the mounting press with the housing and other parts removed to illustrate the frame and the linkage assembly associated with the operator handle and hydraulic jack.
Figure 3:
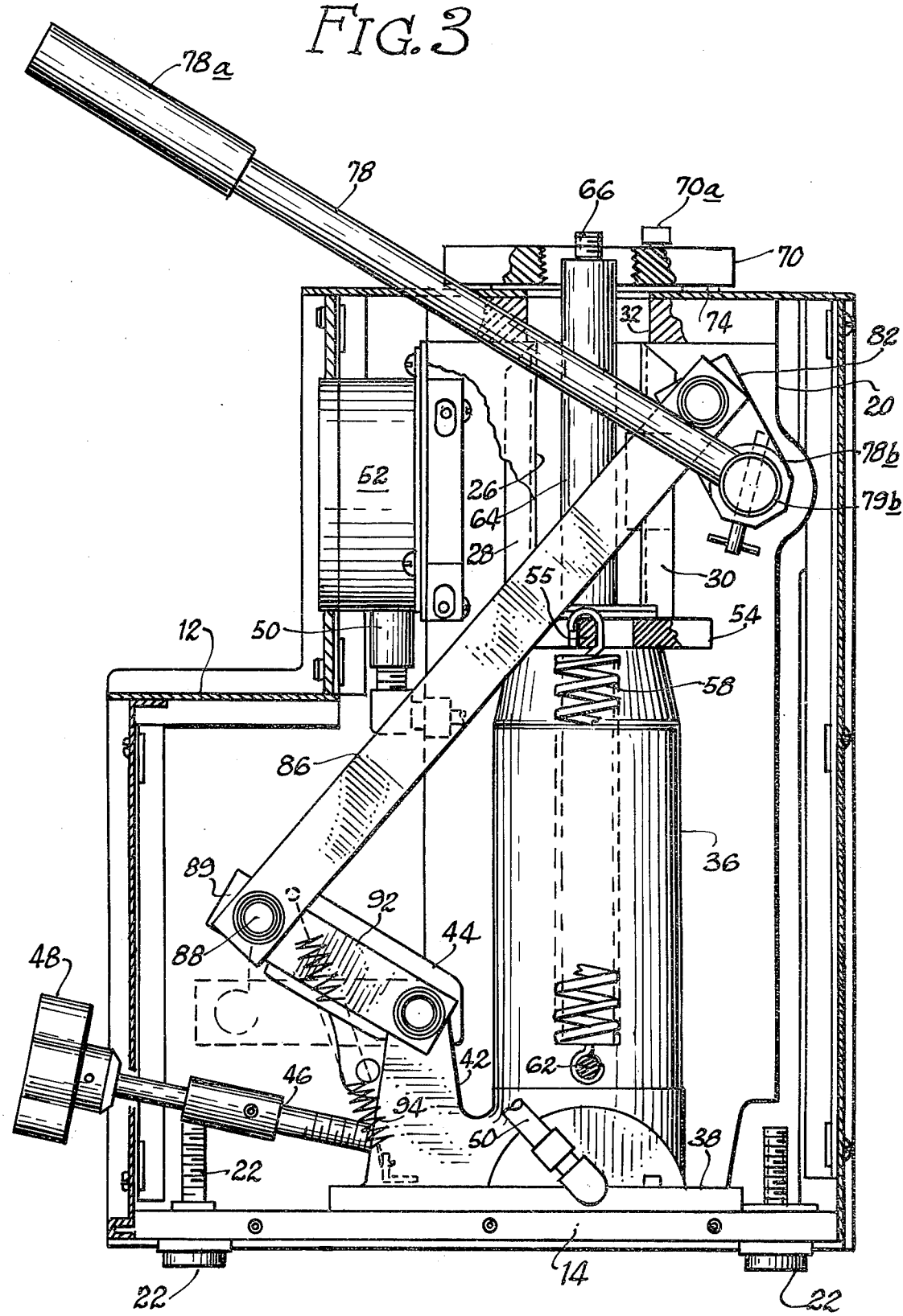
FIG. 3 is an enlarged side view of the mounting press partially in cross-section with the housing side wall and other parts removed for ease of illustration, and showing in full line the operator handle and linkage assembly in an initial position, and further showing in broken line portions of the linkage assembly in a downward position.
Figure 4:
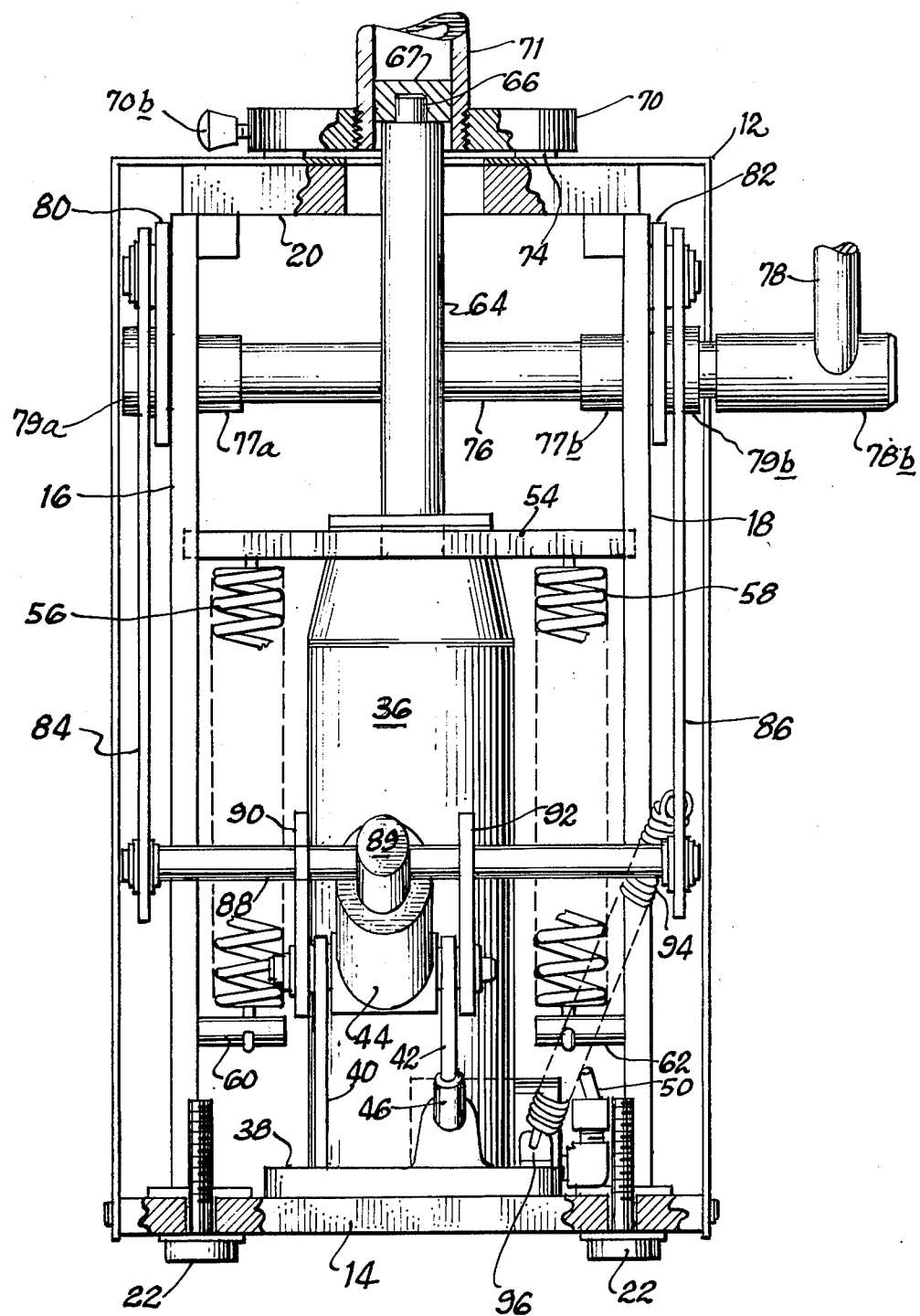
FIG. 4 is an enlarged fragmentary front view of the mounting press partially in cross-section with the housing front wall and other parts removed for ease of illustration.

The linkage assembly is carried by the frame assembly and is connected to the jack assembly for the operation thereof. The linkage assembly includes a horizontal, upper shaft 76, which is supported by and journaled at bearings 77a and 77b to each of the side plates 16 and 18 at a position adjacent the upper rearward corner of the press behind the jack. An operator handle or power arm 78 is connected at one end of the shaft and extends forwardly toward the front of the press. The operator handle is pivotable through an arc of sixty degrees between an upward initial position, as shown in FIG. 3, and a downward molding or final position, as shown in FIGS. 1 and 2, to correspondingly move the other parts of the linkage assembly and socket 44 between a first position, as shown in FIG. 3 and a second molding position, as shown in FIG. 2 and in broken line in FIG. 3.

The operator handle has a rubber grip 78a at one end and a shaft-engaging head 78b at the other end, which is shaped to telescopically fit within either of the two T-shaped spring-pin actuated couplers 79a or 79b positioned at oppposite ends of upper shaft 76.

Two short force-multiplying links 80 and 82 are fixedly secured at the end of the shaft adjacent opposite ends thereof and outwardly of the side plates. The links are angularly displaced on the shaft relative to the operator handle. A pair of elongated force transmitting arms or links 84 and 86 are pivotally connected at their upper ends to the free end of each of the force multiplying links. The arms extend in a generally downward and forward direction from the short links. A horizontal cross shaft 88 is secured to the lower end of each of the arms, as well as to the forward end of the hydraulic jack socket 44. A pair of stabilizing plates or jack levers 90 and 92 are pivotally secured to the support plate ears 40 and 42, as well as being pivotally secured to the lower cross shaft 88 between the socket connection and linkage arm connection. A jack-actuating lever 89 is perpendicularly attached to the middle of cross shaft 88 extends outward and fits into the jack socket 44. A coiled tension return spring 94 is connected at one end to one of the link arms and at the other end to an angle bracket 96 which is secured to the jack support plate 38.

The proportional lengths and positioning of the linkage elements cause the force applied to the jack socket to be greater than the force applied to the operator handle, thereby effectively increasing or multiplying the operator force. Furthermore, the multiplication factor is greater at the lower handle position than at upper handle position. This increase in force multiplication is due to the change in angular relationship between the force multiplying links and the force transmitting arms as the operator handle is rotated downwardly. Thus for the same operator force, a greater force is applied to the jack socket at the lower end of the handle stroke than at the upper end. This is particularly desirable for persons who can exert a greater force on the operator handle at end of the stroke than at the beginning of the stroke. Conversely, less operator force is required at the lower end of the handle stroke to maintain a constant jack-actuating force at the jack socket.

Moreover, the placement of the handle pivot point at the upper rear corner of the press enhances the stability of the press since the major portion of the operator force on the press is in a downward and rearward direction. With this arrangement, it is difficult for the operator to pull or tip the press toward himself when operating the jack.

In the illustrative embodiment, and by way of example only, each of the short force multiplying links are about 1½ inches long between the pivotal connections with the force transmitting arm and the upper shaft, while the power arm or operating handle is about 13½ inches long to center line of the upper shaft. Furthermore, each of the elongated force transmitting arms is about eleven inches long and the jack actuating lever is about three inches long. The positioning of the various elements of the linkage assembly relative to the jack also contributes to the overall stability of the press.

SERVICE OF THE JACK ASSEMBLY

Occasionally the hydraulic jack may require servicing, and it is desirable to avoid disassembling the entire press in order to remove the jack assembly. In particular, the tension springs 56 and 58 may be difficult to remove and replace. In order to aid in servicing, a small annular disk 98 and a bolt 100 are removably mounted to the base plate 14.

In order to remove the jack assembly, the mold cylinder and heater are removed and the jack is pumped with the operator handle until the top edge of the ram 64 and the threaded portion thereof extend above the mold collar 68. The ram stud 66 is removed and the disk is then placed onto the top of the ram. The bolt 100 is then screwed into the ram cylinder so as to hold the disk 98 in place. The jack pressure is then released to retract the jack piston, whereupon the tension springs pull the ram assembly in the downward direction until the disc seats upon the mold collar. Seating of the disk prevents the abutment plate from contacting the top of the jack so that the abutment plate is spaced above the jack once the jack piston has fully retracted. The jack support plate 38 is released from the base plate 14 and the jack assembly is then removed from the back of the press, serviced and replaced. Replacement of the jack assembly is accomplished by reversing the jack removal operation.

MOLDING PROCEDURE

In order to mount a metallurgical specimen, the mold closure 72 is removed and the control knob 48 turned to indicate zero pressure. The power arm or handle 78 should then be pivoted downward counterclockwise to the molding position to raise the ram 64 and mold base above the top of the mold cylinder. Next, the specimen is placed on the face of the mold base or platen above the ram stud 66 and the control knob is rotated to release the pressure buildup during the downward pumping of the operator handle. Releasing the pressure will cause the ram to be lowered, thereby positioning the mold base 67 within the mold cylinder.

A thermoplastic or thermosetting resin, such as phenolic resin or diallyl phthalate, is then poured into the open mold cylinder 71 and the mold sealed by inserting the mold closure 72. The heater sleeve should be operated at a temperature dependent on the particular resin and mold size. For an one-inch mold with diallyl phthalate the temperature should be between 280° F. and 290° F. The operator handle is then pivoted downward until the pressure gauge 52 indicates one-half of the molding pressure. The molding pressure is also dependent on the particular resin and mold size. For an one-inch mold with diallyl phthalate the molding pressure is 3000 psi.

The control knob 48 should then be turned to release the pressure and the operator handle should be quickly pivoted downward to obtain a final pressure slightly greater than the molding pressure. No additional operator attention should be required until the end of the curing period when the specimen is ready for removal from the mold. By way of example, an one-inch mold with diallyl phthalate requires a seven to eight minutes curing period.

OPERATION OF THE PRESS

As the handle is pivoted downward, the upper shaft 76 rotates and pivots the force multiplying links 80 and 82 causing the elongated force-transmitting arms 84 and 86 to move in a generally forward and downward direction. Because the elongated force-transmitting arms are connected to the lower cross shaft 88, the lower cross shaft will move downwardly so that the jack-actuating lever 89 extending from the middle of the lower shaft causes the hydraulic jack socket 44 to pivot in a downward direction. As stated above, the lengths of the linkages and arms are selected so that the force exerted by the operator on the handle is multiplied through the linkage assembly and transmitted to the socket.

The downward stroke of the operator handle pumps the jack and urges the jack piston upwardly which in turn moves the ram assembly in an upper direction to overcome the spring forces exerted by the tension springs 58 and 60. When the proper molding pressure has been achieved, the frame assembly has been stretched by the hydraulic force that has been applied to the mold so that the frame and mold together cooperate to store "elastic potential energy". As the resin is heated, the plastic changes from a solid to a viscous liquid, and the mold volume decreases: the pressure in the mold, however, is maintained by a retraction of the frame and a corresponding release of the elastic energy in the frame without the need for repetitive pumping of the operator handle. At the end of the cooling cycle or curing period, the control knob 48 is rotated so as to release the hydraulic pressure and lower the ram assembly. The lid or mold closure 72 is then removed to open the mold 71 to permit removal of the metallurgical sample.

It will be appreciated that numerous changes and modifications can be made to the embodiment shown herein without departing from the spirit and scope of this invention.

I claim:

1. In a portable mounting press for mounting a metallographic specimen in a plastic mount by applying heat and pressure to a mold containing the specimen and plastic molding material, the press having a frame including a pair of upright side frame members, an apertured top member and a base, a hydraulic jack positioned upright on the base between the side frame members and having a jack actuator located at the front of the jack adjacent the lower end thereof and pivotally movable about a horizontal actuator pivot axis, a downwardly biased ram plate positioned above the hydraulic jack for upward movement upon actuation of the jack, an upright ram secured to the top of the ram plate and extending upwardly through an aperture in the top member, a mold fixedly mounted to the top member and having a mold bottom closure member carried on the upper end of the ram, whereby actuation of the jack will raise the mold bottom closure within the mold to increase pressure therein, the improvement comprising improved force transmitting means for operating the jack actuator to increase the stability of the press and eliminate the need for bolting the same down, said force transmitting means including, in combination, a horizontal crank shaft extending between said side frame members, said crank shaft being located substantially above said actuator pivot axis and rearwardly thereof and being rotatable about its own axis, a manually operable generally forwardly extending handle secured to said crank shaft for rotating the same, a plurality of force-transmitting links interconnecting said crank shaft with said jack actuator to effect pivotal movement of said actuator by manual pumping of said handle, said links including a first link mounted to said crank shaft for conjoint rotation therewith, said first link having a length less than the length of said jack actuator thereby producing a mechanical advantage facilitating manual movement of said handle, and at least one additional link interconnecting said first link with said actuator.

2. An improved mounting press as defined in claim 1 where said horizontal crank shaft is located above the top of said jack and rearwardly of the vertical axis of said jack.

3. An improved mounting press as defined in claim 1 including a first pair of links mounted to opposite ends of said crank shaft for conjoint rotation therewith, a horizontal cross member connected to said jack actuator for actuating the same, and a second pair of links interconnecting said first pair of links with said cross member whereby rotation of said crank shaft by said handle effects pivotal movement of said jack actuator, the length of said first pair of links being less than the length of said jack actuator thereby producing a mechanical advantage facilitating manual movement of said handle.

4. An improved mounting press as defined in claim 1 where said base has two front and two rear feet thereon, and said handle is pivotally movable about the axis of said crank shaft through an arc of at least 45 degrees between an upper position and a lower position, the length of said handle being limited so that when adjacent its lower position a downward force thereon is directed rearwardly of said front feet thereby avoiding a tendency to tip said press forwardly.

5. An improved mounting press as defined in claim 3 including a third pair of links, each of said third pair of links having one end pivotally connected to said cross member and the other end pivotally connected to said frame at the pivot axis of said jack actuator.

6. An improved mounting press as defined in claim 3 where said handle is pivotally movable about the axis of said crank shaft through an arc of at least 45 degrees between an upper position and a lower position, and said first pair of links are approximately perpendicular to said second pair of links when said handle is near its upper position and become more nearly colinear with said second pair of links as said handle approaches its lower position, thereby producing a maximum mechanical advantage near the lower end of the stroke of said handle.

7. An improved mounting press as defined in claim 1 where said side frame members comprise flat plates of a thickness which permits elastic stretching thereof when said jack is operated so as to store energy therein, whereby said frame will maintain pressure in said mold when said molding material passes from a solid phase to a liquid phase during a molding operation.

* * * * *